(12) United States Patent
Liu (10) Patent No.: US 7,944,349 B2
(45) Date of Patent: May 17, 2011

(54) VEHICLE DECELERATION WARNING APPARATUS

(75) Inventor: Fu-Han Liu, Junghe (TW)

(73) Assignee: X Y E Computer Co., Ltd, Dongguan, Guangdong Province (CN)

( * ) Notice: Subject to any disclaimer, the term of this patent is extended or adjusted under 35 U.S.C. 154(b) by 945 days.

(21) Appl. No.: 11/838,225

(22) Filed: Aug. 14, 2007

(65) Prior Publication Data

US 2009/0045931 A1 Feb. 19, 2009

(51) Int. Cl.
*B60Q 1/50* (2006.01)
*B60Q 1/34* (2006.01)
*B60Q 1/44* (2006.01)
*G06F 7/70* (2006.01)
*G06G 7/00* (2006.01)
*G06G 7/76* (2006.01)

(52) U.S. Cl. ........ 340/467; 340/464; 340/465; 340/475; 340/479; 701/70

(58) Field of Classification Search ........... 340/463–479
See application file for complete search history.

(56) References Cited

U.S. PATENT DOCUMENTS

| 4,097,842 | A  | * | 6/1978 | Zalar et al. | 340/467 |
| 2002/0171543 | A1 | * | 11/2002 | Abbe et al. | 340/468 |
| 2003/0095041 | A1 | * | 5/2003 | Perlman et al. | 340/463 |
| 2004/0227646 | A1 | * | 11/2004 | Henry | 340/902 |

* cited by examiner

*Primary Examiner* — Benjamin C Lee
*Assistant Examiner* — Michael Shannon
(74) *Attorney, Agent, or Firm* — Apex Juris, pllc; Tracy M Heims (57) ABSTRACT

A vehicle deceleration warning apparatus is activated immediately when a driver of the vehicle intends to decelerate. The vehicle deceleration warning apparatus includes an ignition monitoring module, a first microprocessor module, a wireless transmitting module, a wireless receiving module, a second microprocessor module, and a display driving module. The ignition monitoring module receives an ignition signal and delivers it to the first microprocessor module. The first microprocessor module performs a calculation by adopting the ignition signal to generate a control signal. Then, the control signal is transmitted to the second microprocessor module wireless transmission. Finally, the second microprocessor module controls the display driving module to generate a display driving signal to a display device, such as a brake light and a warning lamp, so as to generate a warning light representing deceleration of the vehicle.

4 Claims, 8 Drawing Sheets

VEHICLE DECELERATION WARNING APPARATUS

BACKGROUND OF THE INVENTION

1. Field of Invention

The present invention relates to a warning apparatus of a vehicle, and more particularly, to a vehicle deceleration warning apparatus.

2. Related Art

When driving an automobile or a motorcycle, a driver follows another automobile or a motorcycle ahead him/her at most of time, which results in that the overtaking collisions take up 15%-20% of total traffic accidents. Currently, all vehicles are equipped with center high-mounted stop lamp at the rear, for alerting the driver of the following vehicle to the braking action, so that the driver of the following vehicle can step on the brake pedal immediately. Since in braking, the braking distance is mainly determined by the brake reaction time, travel speed, and brake deceleration rate, the overall braking distance is shorten after the time for the awareness of the braking action is shortened, thereby reducing the occurrence of the overtaking collisions.

However, the center high-mounted stop lamp in the prior art is activated at the same time with the actuation of the original brake system of a vehicle (such as an automobile), and will not function until the brake pedal is pressed down by the driver to trigger a micro switch. However, if the driver only releases the throttle to slow down the car, no warning light or signal is sent to alert the driver of the following vehicle to the slowing down action of the preceding vehicle. As for common people, optic nerve reacts slowly to the change of the linear distance right ahead and a warning lamp always light on. Hence, when feeling tired or losing concentration, the driver often cannot perceive the slowing down of the preceding vehicle till getting too close to the preceding vehicle, and then slows down in a hurry. If braking suddenly at that time, the braking distance is insufficient as the optimal braking moment is missed, thus causing an overtaking collision. The above case becomes more serious when the driver cannot see properly in rain and snow, dust storm, or at night.

In addition, as the greenhouse effect is getting worse, each country pays attention to environmental protection. Carbon dioxide exhausted by the automobiles and motorcycles running at idle speed is one of the greenhouse gases resulting in global warming. Therefore, each country has constituted laws and regulations to forbid automobiles or motorcycles to run at idle speed for a long time, for the purpose of alleviating environmental pollution. However, the current automobiles or motorcycles are not provided with designs of idle running warning mechanism, so it has become an urgent topic for researchers to solve how to provide a warning mechanism for alerting drivers to avoid vehicles running at idle speed.

SUMMARY OF THE INVENTION

In view of the above problems, the object of the present invention is directed to a vehicle deceleration warning apparatus. According to the present invention, a center high-mounted stop lamp of the vehicle is activated immediately when a driver releases the throttle of the vehicle. Therefore, the driver of a following vehicle has more time to response the braking action, thereby improving the safety in driving vehicles. Furthermore, through determining whether an ignition signal remains in an idle running state of the vehicle for a predetermined time interval, an alerting device is triggered to inform the driver to turn off the vehicle, so as to avoid the vehicle running at idle speed for a long time and thus alleviate pollution to environment.

A vehicle deceleration warning apparatus of the present invention includes an ignition monitoring module, a first microprocessor module, wireless transmitting module, a wireless receiving module, a second microprocessor module and a display driving module. The ignition monitoring module is electrically connected to an ignition signal generation module of the vehicle for receiving a first voltage signal generated by the ignition signal generation module and a display driving module, converting the first voltage signal into a second voltage signal, and then outputting the second voltage signal. The first microprocessor module is electrically connected to the ignition monitoring module for performing calculation based on a frequency of the second voltage signal output by the ignition monitoring module, wherein the first microprocessor module derives an encoded first display control signal after the frequency of the second voltage signal descends. The wireless transmitting module is electrically connected to the first microprocessor module, for receiving the first display control signal and transmitting the first display control signal to a remote end by wireless transmission. The wireless receiving module is disposed at a remote end for receiving the first display control signal transmitted by the wireless transmitting module and decoding the first display control signal. The second microprocessor module is electrically connected to the wireless receiving module for receiving the first display control signal. And the display driving module is electrically connected to the second microprocessor module for generating a first display driving signal according to the first display control signal output by the second microprocessor module.

Moreover, a vehicle deceleration warning apparatus of another embodiment of the present invention includes an ignition monitoring module, a microprocessor module, and a display driving module. The ignition monitoring module is electrically connected to an ignition signal generation module of the vehicle for receiving a first voltage signal generated by the ignition signal generation module by and a display driving module, converting the first voltage signal into a second voltage signal, and then output the second voltage signal. The microprocessor module is electrically connected to the ignition monitoring module, for performing calculation based on a frequency of the second voltage signal output by the ignition monitoring module, wherein the microprocessor derives a first display control signal when the frequency of the second voltage signal descends. And a display driving module is electrically connected to the first microprocessor module, for generating a first display driving signal according to the first display control signal output by the first microprocessor module.

The vehicle deceleration warning apparatus of the present invention determines whether a driver intends to slow down through detecting the change of the ignition signal. If the driver slows down, the vehicle deceleration warning apparatus activates the brake light of the vehicle immediately. Therefore, the driver of the following vehicle has more time to response the braking action, thereby improving the safety in driving vehicles. The control signal of the brake light is transmitted by wireless transmission. As such, the driver may fix the brake light at any eye-catching position at will, such as on a safety helmet, clothes, a bicycle mat, or a rear side of a car, thereby enhancing the convenience of the brake light installation. Additionally, after the vehicle runs at idle speed for a time interval, a flickering light or sound is sent to alert the driver, so as to remind the driver to turn off the vehicle for saving fuel consumption and minimizing pollution to environment.

The features and practice of the preferred embodiments of the present invention will be illustrated below in detail with reference to the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
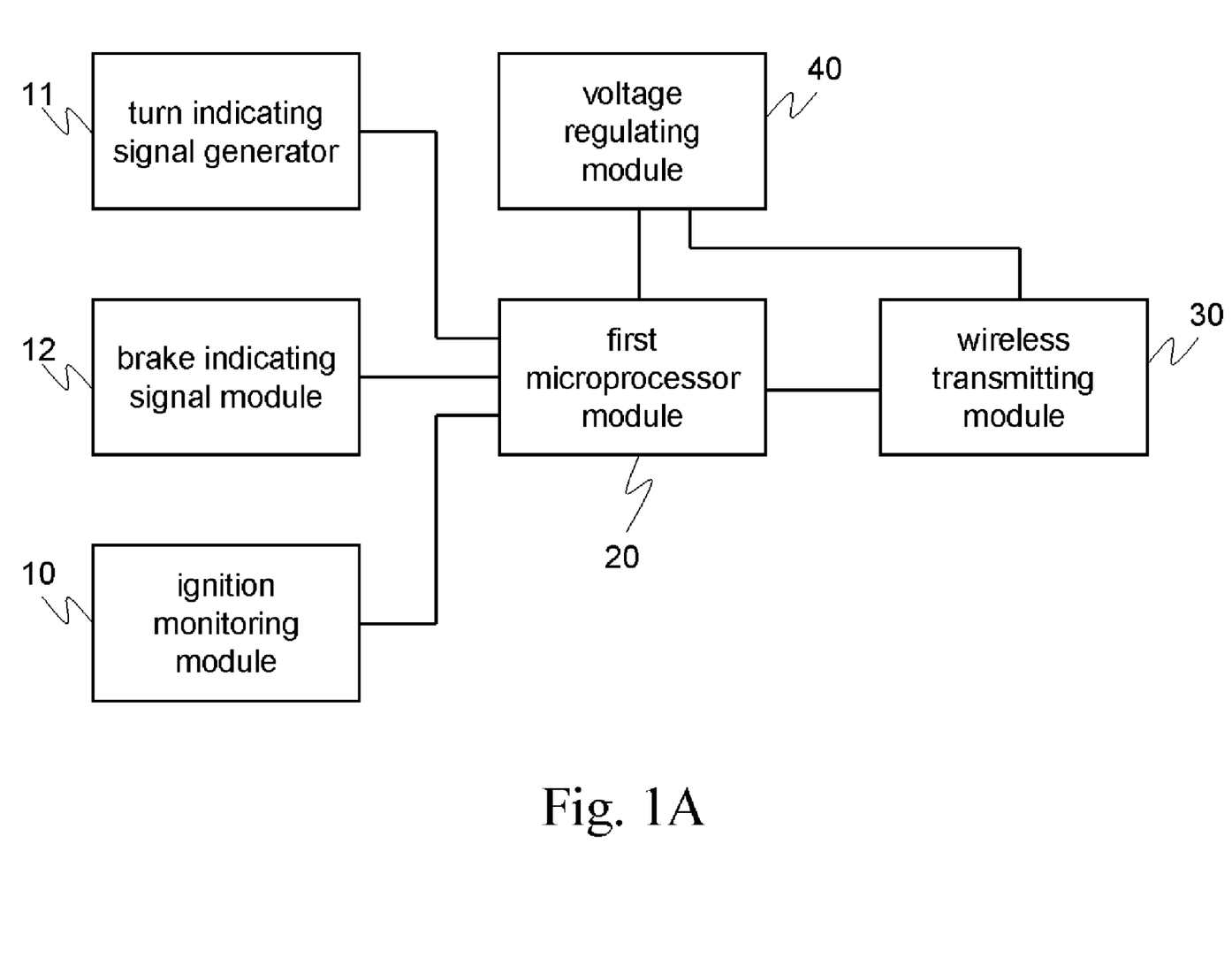
FIG. 1A is a system block diagram of a transmitter end according to the first embodiment of the present invention.
Figure 1B:
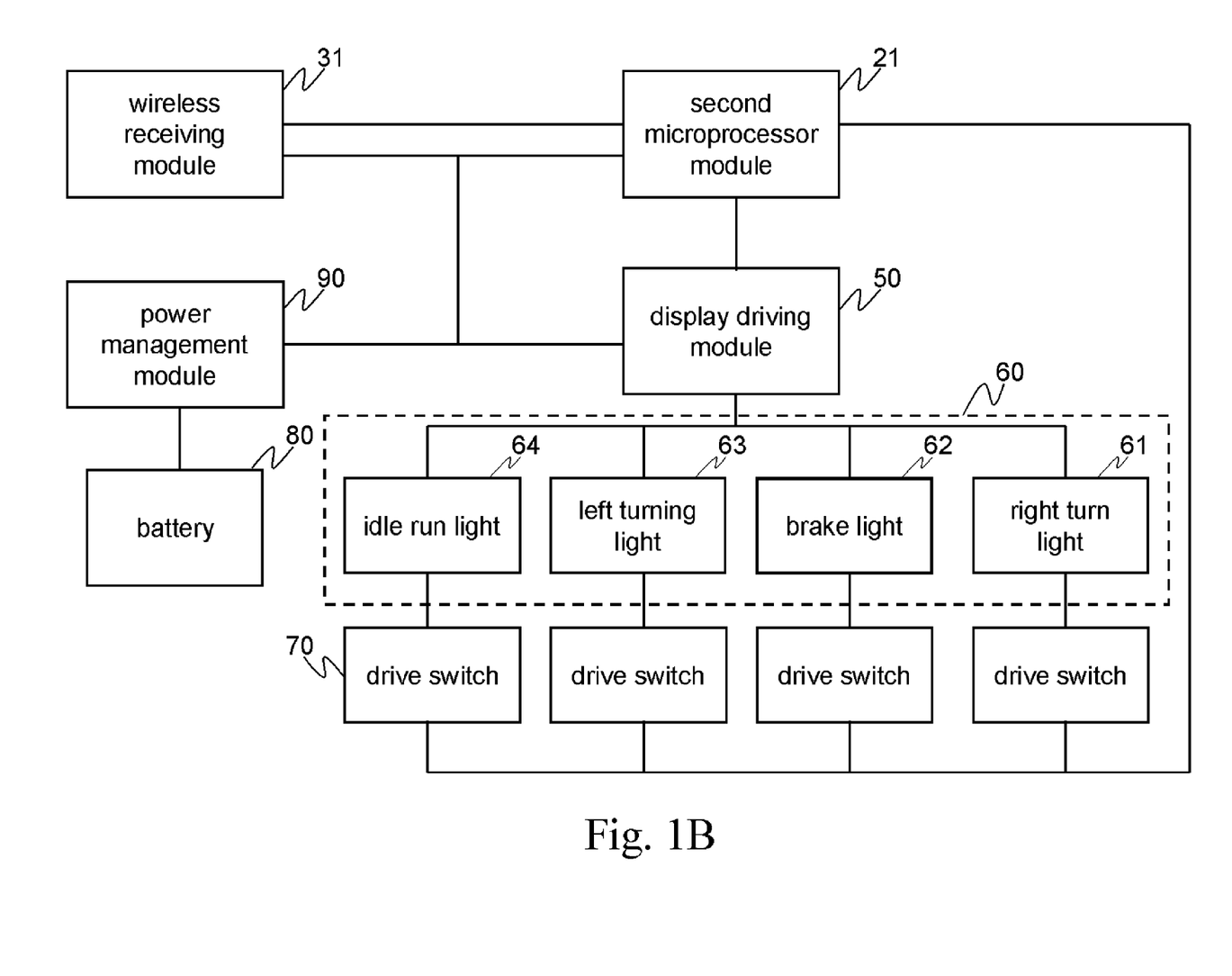
FIG. 1B is a system block diagram of a receiver end according to the first embodiment of the present invention.

Referring to FIGS. 1A and 1B, a system block diagram of a transmitter end and a system block diagram of a receiver end according to the first embodiment of the present invention are shown. As shown in FIG. 1A, the transmitter end of the vehicle deceleration warning apparatus provided by the present invention includes an ignition monitoring module 10, a turn indicating signal generator 11, a brake indicating signal module 12, a first microprocessor module 20, a wireless transmitting module 30, and a voltage regulating module 40.

The ignition monitoring module 10 is electrically connected to an ignition signal generation module of the vehicle (not shown), for receiving a first voltage signal generated by the ignition signal generation module by measuring output voltage division of the ignition signal module, and converting the first voltage signal (for example, 12 volts to 14.8 volts) into a second voltage signal (for example, 0 volts to 5 volts), in which the first voltage signal is higher than the second voltage signal. Since the first voltage signal received by the ignition monitoring module 10 cannot be directly calculated by the first microprocessor module 20, the first voltage signal having a high voltage may be converted into the second voltage signal having a low voltage, and then output to the first microprocessor module 20 to be calculated. The ignition monitoring module 10 may be, for example, constituted by a resistor voltage division circuit and a voltage regulator circuit.

The turn indicating signal generator 11 is electrically connected to the first microprocessor module 20, for generating a turn indicating signal according to an operation result (for example, turning a steering wheel left/right or turning a manual bounce switch left/right) of the driver, and outputting the turn indicating signal to the first microprocessor module 20, such that the first microprocessor module 20 generates an encoded second display control signal.

The brake indicating signal module 12 is electrically connected to the first microprocessor module 20, for generating a brake indicating signal according to the operation result (for example, stepping on a brake pedal) of the driver and outputting the brake indicating signal to the first microprocessor module 20, such that the first microprocessor module 20 generates a first display control signal.

The first microprocessor module 20 is electrically connected to the ignition monitoring module 10, for performing calculation based on a frequency of the second voltage signal output by the ignition monitoring module 10, and deriving a first display control signal. The frequency of the second voltage signal corresponds to the frequency of the first voltage signal, and the frequency of a voltage signal varies with the change of a throttle. In other words, the first microprocessor module 20 determines whether the engine speed decreases by monitoring the variation of the frequency of the second voltage signal, and generates an encoded first display control signal when the frequency of the second voltage signal descends (equivalent to the condition that the engine speed decreases). The first microprocessor module 20 may be, for example, constituted by a micro-controller unit (MCU). Furthermore, the first microprocessor module 20 performs calculation based on the frequency of the second voltage signal output by the ignition monitoring module 10, and generates an encoded third display control signal after the frequency of the second voltage signal remains in an idle running state for a predetermined time interval (for example, 3 minutes or 5 minutes).

The wireless transmitting module 30 is electrically connected to the first microprocessor module 20, for receiving the first display control signal output by the first microprocessor module 20, and transmitting the first display control signal to a remote end by wireless transmission. The wireless transmitting module 30 may be, for example, constituted by a microstrip antenna circuit.

The voltage regulating module 40 is electrically connected to the first microprocessor module 20 and the wireless transmitting module 30, for providing a stable working power to the first microprocessor module 20 and the wireless transmitting module 30.

Then, as shown in FIG. 1B, the receiver end of the vehicle deceleration warning apparatus disclosed in the present invention includes a wireless receiving module 31, a second microprocessor module 21, a display driving module 50, a display module 60, a drive switch 70, a battery 80, and a power management module 90.

The wireless receiving module 31 is disposed at the remote end (for example, near a rear compartment or a brake light), for receiving the first display control signal, the second display control signal, or the third display control signal transmitted by the wireless transmitting module 30, and decodes the first display control signal, the second display control signal, or the third display control signal.

The second microprocessor module 21 is electrically connected to the wireless receiving module 31, for receiving the first display control signal, the second display control signal, or the third display control signal, and outputting the first display control signal, the second display control signal, or the third display control signal to the display driving module 50. The second microprocessor module 21 may be, for example, constituted by an MCU.

The display driving module 50 is electrically connected to the second microprocessor module 21, for generating a corresponding first display driving signal, second display driving signal, or third display driving signal according to the first display control signal, second display control signal, or third display control signal output by the second microprocessor module 21. Since a display control signal cannot directly drive the display module 60, the display driving module 50 is used to firstly amplify the signal to generate a display driving signal. The display driving module 50 may be, for example, constituted by a signal amplifier circuit.

The display module 60 is electrically connected to the display driving module 50 and includes a right turning light 61, a brake light 62, a left turning light 63, and an idle run light 64, for generating warning light corresponding to engine deceleration, turning left, turning right, and running at idle speed according to the first display driving signal, the second display driving signal, or the third display driving signal. The warning light includes color change and/or flickering light. The display module 60 may be, for example, constituted by a color changing LED circuit or an RGB LED circuit.

The drive switch 70 is electrically connected to the display module 60 for turning on/off the display module 60. For example, the first display control signal controls the brake light 62 to turn on/off, the second display control signal controls the right turning light 61 and the left turning light 63 to turn on/off, and the third display control signal controls the idle run light 64 to turn on/off. The drive switch 70 may be, for example, constituted by a power metal oxide semiconductor field Effect transistor (power MOSFET) circuit and a field effect transistor (FET) circuit.

The power management module 90 is electrically connected to the wireless receiving module 31, the second microprocessor module 21, and the display driving module 50, for monitoring and managing the power supply of the wireless receiving module 31, the second microprocessor module 21, the display driving module 50, the display module 60, the drive switch 70, and/or the battery 80.

The battery 80 is electrically connected to the power management module 90, for providing the power required by the operation of the wireless receiving module 31, the second microprocessor module 21, the display driving module 50, the display module 60, the drive switch 70, and the power management module 90.

Figure 2:
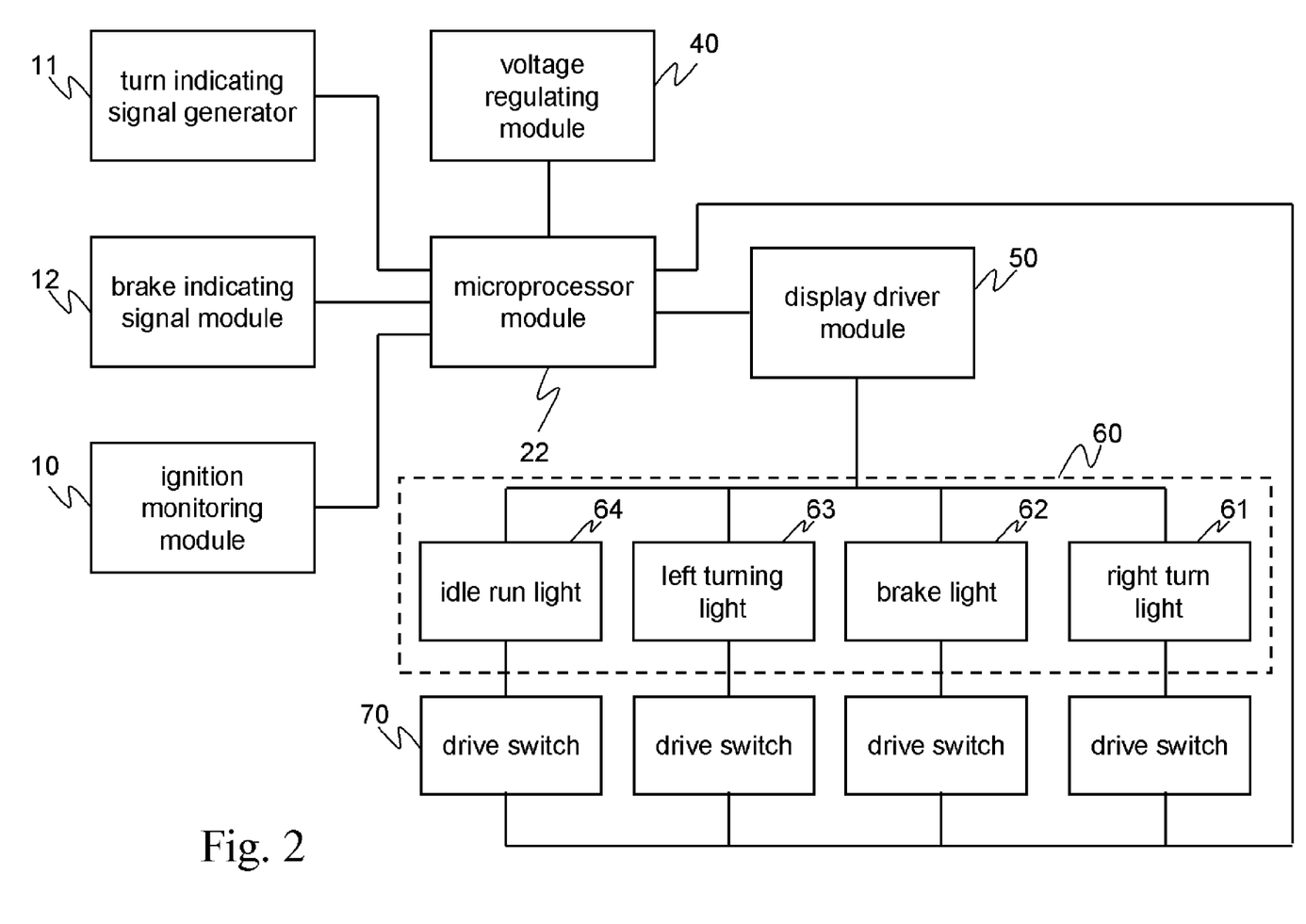
FIG. 2 is a system block diagram of the second embodiment of the present invention.

Referring to FIG. 2, a system block diagram of the second embodiment of the present invention is shown. As shown in FIG. 2, the vehicle deceleration warning apparatus of the present invention includes an ignition monitoring module 10, a turn indicating signal generator 11, a brake indicating signal module 12, a microprocessor module 22, a voltage regulating module 40, a display driving module 50, a display module 60, and a drive switch 70.

The ignition monitoring module 10 is electrically connected to an ignition signal generation module of a vehicle (not shown), for receiving a first voltage signal generated by the ignition signal generation module by measuring output voltage division of the ignition signal module, and converting the first voltage signal (for example, 12 volts to 14.8 volts) into a second voltage signal (for example, 0 volts to 5 volts), in which the first voltage signal is higher than the second voltage signal. Since the first voltage signal received by the ignition monitoring module 10 cannot be directly calculated by the microprocessor module 22, the first voltage signal having a high voltage is converted into the second voltage signal having a low voltage, and then transmitted to the microprocessor module 22 for calculation. The ignition monitoring module 10 may be, for example, constituted by a resistor voltage division circuit and a voltage regulator circuit.

The turn indicating signal generator 11 is electrically connected to the microprocessor module 22, for generating a turn indicating signal according to an operation result (for example, turning a steering wheel left/right or turning a manual bounce switch left/right) of a driver, and outputting the turn indicating signal to the microprocessor module 22, such that the microprocessor module 22 generates a second display control signal.

A brake indicating signal module 12 is electrically connected to the microprocessor module 22, for generating a brake indicating signal according to an operation result (for example, stepping on a brake pedal) of a driver and outputting the brake indicating signal to the microprocessor module 22, such that the microprocessor module 22 generates a first display control signal.

The microprocessor module 22 is electrically connected to the ignition monitoring module 10, for performing calculation based on the frequency of the second voltage signal output by the ignition monitoring module 10, so as to derive a first display control signal. The frequency of the second voltage signal corresponds to the frequency of the first voltage signal, and the frequency of a voltage signal varies with the changes of the throttle. In other words, the microprocessor module 22 determines whether the engine speed decreases by monitoring the variation of the frequency of the second voltage signal, and generates a first display control signal when the frequency of the second voltage signal descends (equivalent to the condition that the engine speed decreases). The microprocessor module 22 may be, for example, constituted by a micro-controller unit (MCU). Furthermore, the microprocessor module 22 performs calculation according to the frequency of the second voltage signal output by the ignition monitoring module 10, and generates a third display control signal after the frequency of the second voltage signal remains in an idle running state for a predetermined time interval (for example, 3 minutes or 5 minutes).

The voltage regulating module 40 is electrically connected to the microprocessor module 22, for providing a stable working power to the microprocessor module 22.

The display driving module 50 is electrically connected to the microprocessor module 22, for generating a corresponding first display driving signal, second display driving signal, or third display driving signal according to the first display control signal, second display control signal, or third display control signal output by the microprocessor module 22. Since the display control signal cannot directly drive the display module 60, the display driving module 50 is used to firstly amplify the signal to generate a display driving signal. The display driving module 50 may be, for example, constituted by a signal amplifier circuit.

The display module 60 is electrically connected to the display driving module 50 and includes a right turning light 61, a brake light 62, a left turning light 63, and an idle run light 64, for generating light-on effects corresponding to engine deceleration, turning left, turning right, and running at idle speed according to the first display driving signal, the second display driving signal, or the third display driving signal. The light-on effects include color change and/or flickering light. The display module 60 may be, for example, constituted by a color changing LED circuit or an RGB LED circuit.

The drive switch 70 is electrically connected to the display module 60 for turning on/off the display module 60. For example, the first display control signal controls the brake light 62 to turn on/off, the second display control signal controls the right turning light 61 and the left turning light 63 to turn on/off, and the third display control signal controls the idle run light 64 to turn on/off. The drive switch 70 may be, for example, constituted of a power MOSFET circuit and an FET circuit.

Figure 3A:
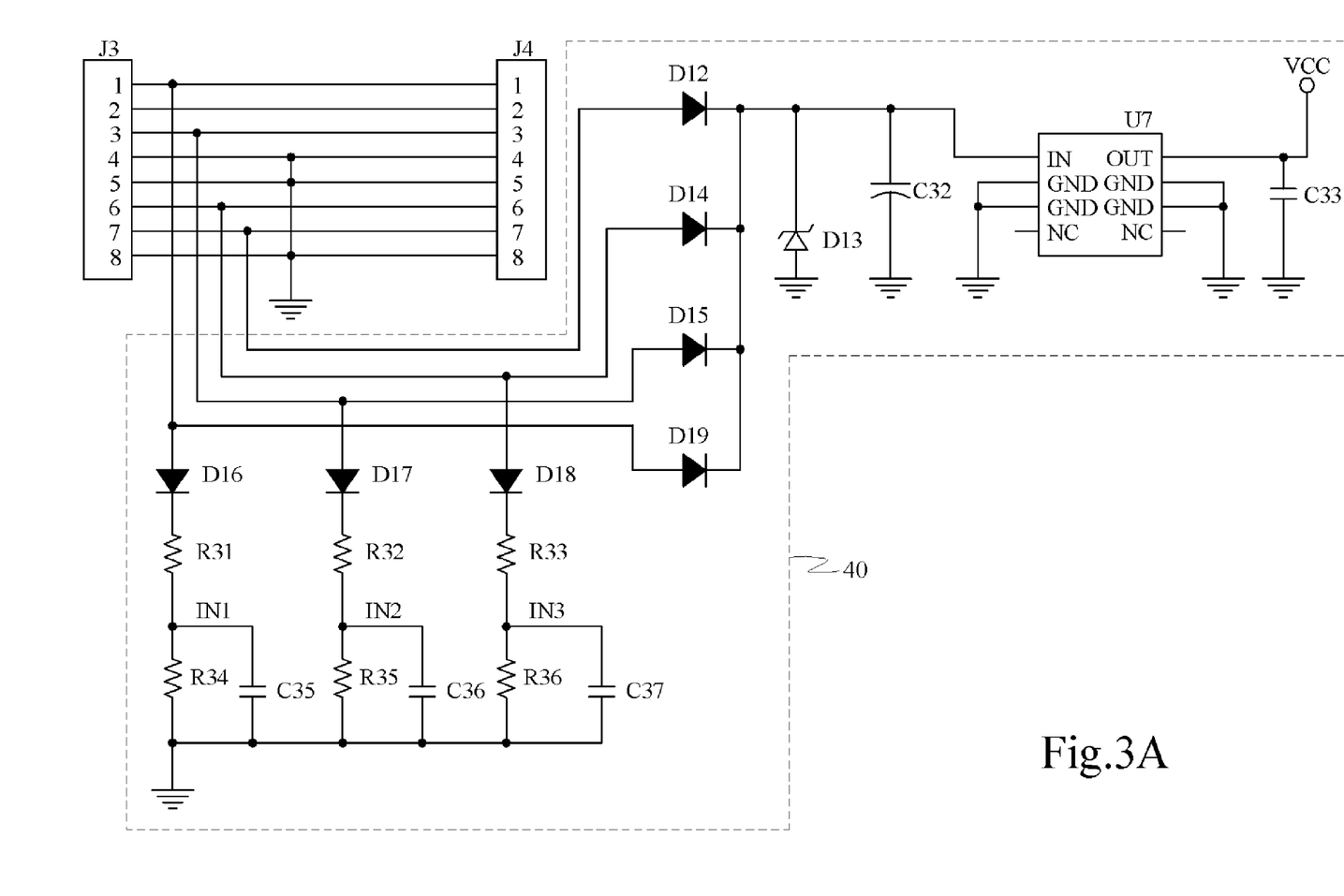
FIG. 3A and FIG. 3B show the transmitter end according to the first embodiment of the present invention.
Figure 3B:
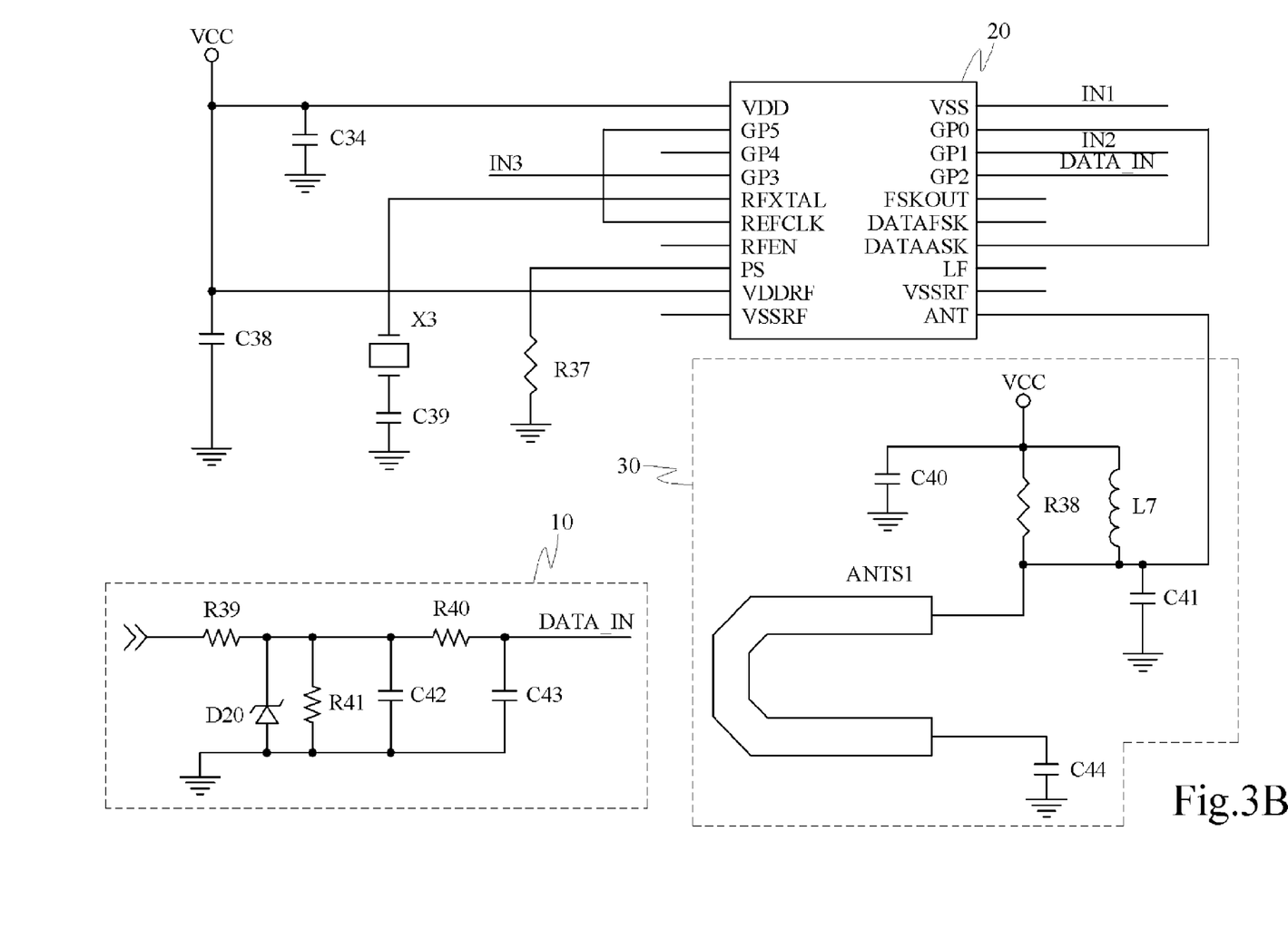

Referring to FIG. 3A and FIG. 3B, a schematic circuit of the transmitter end according to the first embodiment of the present invention is shown. The connection relationship of the circuit elements are described as follows.

The ignition monitoring module 10 includes a resistor 39, a resistor 40, a resistor 41, a Zener diode D20, a capacitor C42, and a capacitor C43. The second end of the resistor R39 is electrically connected to the second end (i.e., the negative end) of the Zener diode D20, the first end of the resistor R41, the first end of the capacitor C42, and the first end of the resistor R40, respectively. The first end (i.e., the positive end) of the Zener diode D20 is electrically connected to a grounding terminal, the second end of the resistor R41, the second end of the capacitor C42, and the second end of the capacitor C43, respectively. The first end of the capacitor C43 is electrically connected to the second end of the resistor R40.

The first microprocessor module 20 has 20 pins. VDD is electrically connected to the first end of the capacitor C34, a power source VCC, and the second end of the capacitor C34 is electrically connected to the grounding terminal. GP5 is electrically connected to REFCLK. GP4 is idle. GP3 is electrically connected to a node IN3. RFXTAL is electrically connected to the first end of an oscillator X3, the second end of the oscillator X3 is electrically connected to the first end of the capacitor C39, and the second end of the capacitor C39 is electrically connected to the grounding terminal. RFEN is idle. PS is electrically connected to the first end of the resistor R37, and the second end of the resistor R37 is electrically connected to the grounding terminal. VDDRF is electrically connected to the first end of the capacitor C38, the power source VCC, and the second end of the capacitor C38 is electrically connected to the grounding terminal. VSSRF is idle. ANT is electrically connected to the wireless transmitting module 30. LF is idle. DATAASK is electrically connected to GP0. DATAFSK is idle. FSKOUT is idle. GP2 is electrically connected to the ignition monitoring module 10. GP1 is electrically connected to a node IN2. VSS is electrically connected to a node IN1.

The wireless transmitting module 30 includes a resistor R38, a capacitor C40, a capacitor C41, a capacitor C44, an inductor L7, and an antenna ANTS1. The first end of the resistor R38 is electrically connected to the power source VCC, the first end of the capacitor C40, and the first end of the inductor L7. The second end of the capacitor C40 is electrically connected to the grounding terminal, the second end of the inductor L7 is electrically connected to the second end of the resistor R38, the first end of the capacitor C41, ANT of the first microprocessor module 20, and the first end of the antenna ANTS1. The second end of the capacitor C41 is electrically connected to the grounding terminal. The second end of the antenna ANTS1 is electrically connected to the first end of the capacitor C44, and the second end of the capacitor C44 is electrically connected to the grounding terminal.

The voltage regulating module 40 includes a resistor R31, a resistor R32, a resistor R33, a resistor R34, a resistor R35, a resistor R36, a capacitor C32, a capacitor C33, a capacitor C35, a capacitor C36, a capacitor C37, a Zener diode D13, a diode D12, a diode D14, a diode D15, a diode D16, a diode D17, a diode D18, a diode D19, a voltage regulator integrated circuit U7. The first end of the resistor R31 is electrically connected to the second end (i.e., the negative end) of the diode D16, and the second end of the resistor R31 is electrically connected to the node IN1. The first end of the resistor R34 is electrically connected to the node IN1, and the second end of the resistor R34 is electrically connected to the grounding terminal and the first end of the capacitor C35. The first end of the capacitor C35 is electrically connected to the node IN1. The first end (i.e., the positive end) of the diode D16 is electrically connected to the pin 1 of a connector J3 and a connector J4.

The first end of the resistor R32 is electrically connected to the second end (i.e., the negative end) of the diode D17, and the second end of the resistor R32 is electrically connected to the node IN2. The first end of the resistor R35 is electrically connected to the node IN2, and the second end of the resistor R35 is electrically connected to the grounding terminal and the first end of the capacitor C36. The first end of the capacitor C36 is electrically connected to the node IN1. The first end (i.e., the positive end) of the diode D17 is electrically connected to the pin 3 of the connector J3 and the connector J4.

The first end of the resistor R33 is electrically connected to the second end (i.e., the negative end) of the diode D17, and the second end of the resistor R33 is electrically connected to the node IN3. The first end of the resistor R36 is electrically connected to the node IN3, and the second end of the resistor R36 is electrically connected to the grounding terminal, the first end of the capacitor C37. The first end of the capacitor C37 is electrically connected to the node IN1. The first end (i.e., the positive end) of the diode D18 is electrically connected to the pin 6 of the connector J3 and the connector J4.

The first end (i.e., the positive end) of the Zener diode D13 is electrically connected to the grounding terminal, and the second end (i.e., the negative end) of the Zener diode D13 is electrically connected to the second end (i.e., the negative end) of the diode D12, the second end (i.e., the negative end) of the diode D14, the second end (i.e., the negative end) of the diode D15, the second end (i.e., the negative end) of diode D19, the first end of the capacitor C32, the pin IN of the voltage regulator integrated circuit U7. The first end of the capacitor C32 is electrically connected to the grounding terminal. The first end (i.e., the positive end) of the diode D12 is electrically connected to the pin 7 of the connector J3 and the connector J4. The first end (i.e., the positive end) of diode D14 is electrically connected to the pin 6 of the connector J3 and the connector J4. The first end (i.e., the positive end) of the diode D15 is electrically connected to the pin 3 of the connector J3 and the connector J4. The first end (i.e., the positive end) of the diode D19 is electrically connected to the pin 1 of the connector J3 and the connector J4. Additionally, the pin 4, pin 5, and pin 8 of the connector J3 and the connector J4 are electrically connected to the grounding terminal.

The pin GND of the voltage regulator integrated circuit U7 is electrically connected to the grounding terminal. The pin NC of the voltage regulator integrated circuit U7 is idle. The pin OUT of the voltage regulator integrated circuit U7 is electrically connected to the power source VCC and the first end of the capacitor C33, and the second end of the capacitor C33 is electrically connected to the grounding terminal.

The circuit operation is described as follows.

Firstly, the first microprocessor module 20 performs related calculations through obtaining the changes of the node IN1, the node IN2, the node IN3, the signal of data DATA_IN. If the calculation result contains: (1) the frequency of the ignition signal descends, (2) the driver steps on the brake pedal, (3) the driver controls the vehicle to turn left, (4) the driver controls the vehicle to turn right or (4) the vehicle runs at idle speed for a predetermined time interval, the first microprocessor module 20 sends an encoded first display control signal, second display control signal, or third display control signal to the wireless transmitting module 30, so as to transmit the encoded first display control signal, second display control signal, or third display control signal which to the remote end wireless transmission.

Figure 3C:
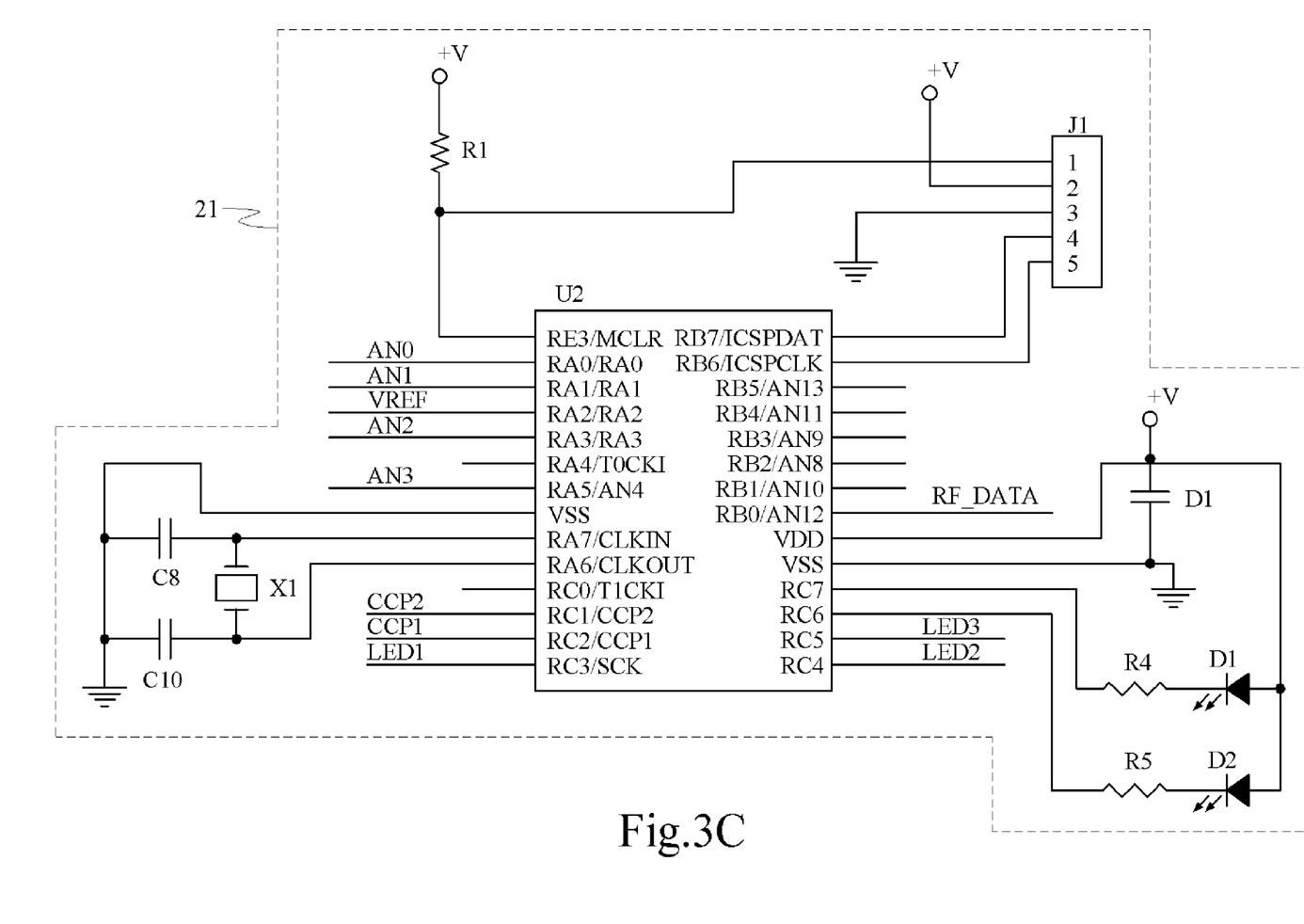
FIG. 3C, FIG. 3D and FIG. 3E show the receiver end according to the first embodiment of the present invention.
Figure 3D:
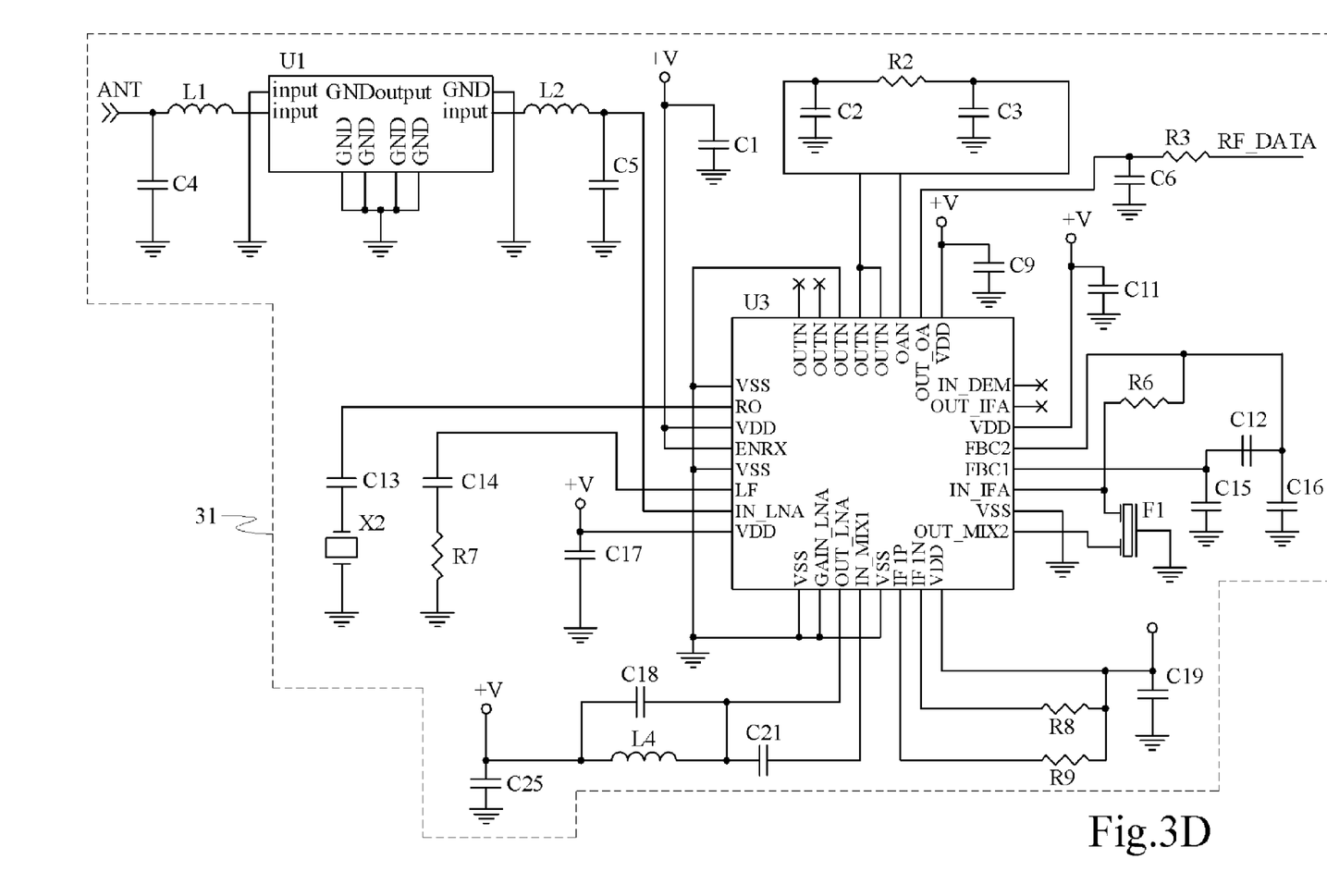
Figure 3E:
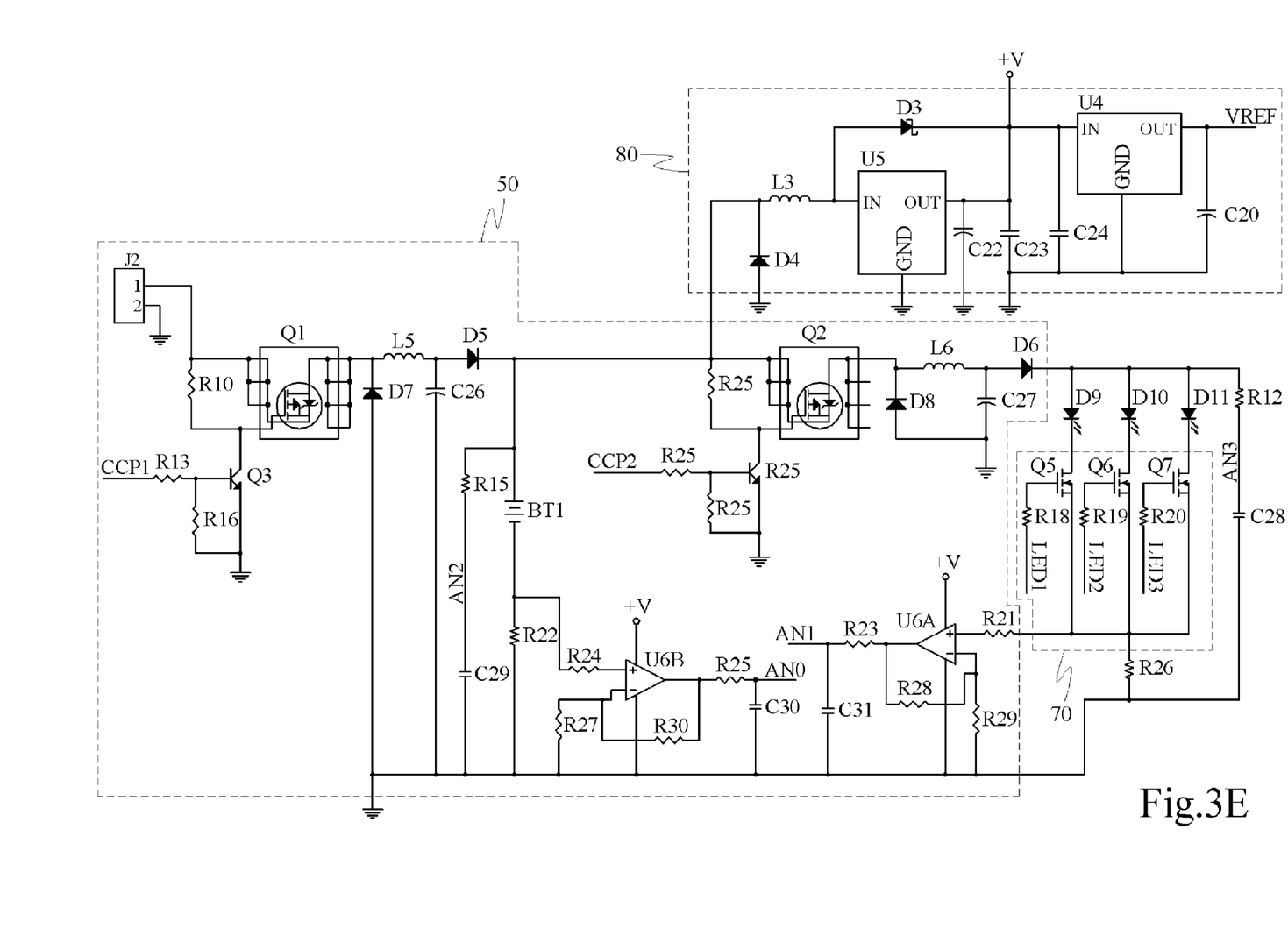

Then, referring to FIG. 3C, FIG. 3D, and FIG. 3E, a schematic circuit of the receiver circuit according to the first embodiment of the present invention is shown. The connection relations of the circuit elements are described as follows.

The wireless receiving module 31 includes a resistor R2, a resistor R3, a resistor R6, a resistor R7, a resistor R8, a resistor R9, a capacitor C1, a capacitor C2, a capacitor C3, a capacitor C4, a capacitor C5, a capacitor C6, a capacitor C9, a capacitor C11, a capacitor C12, a capacitor C13, a capacitor C14, a capacitor C15, a capacitor C16, a capacitor C17, a capacitor C18, a capacitor C19, a capacitor C21, a capacitor C25, an inductor L1, an inductor L2, an inductor L4, an oscillator X2, an oscillator F1, a filter integrated circuit U1, and a receiver integrated circuit U3. The pin Input of the filter integrated circuit U1 is electrically connected to the grounding terminal, and another pin Input of the filter integrated circuit U1 is electrically connected to the first end of the inductor L1. The second end of the inductor L1 receives a wireless signal and is electrically connected to the first end of the capacitor C4. The second end of the capacitor C4 is electrically connected to the grounding terminal, and the pin GND of the filter integrated circuit U1 is electrically connected to the grounding terminal. The pin OUTPUT of the filter integrated circuit U1 is electrically connected to the first end of the inductor L2. The second end of the inductor L2 is electrically connected to the first end of the capacitor C5 and the pin IN_LNA of the receiver integrated circuit U3. The second end of the capacitor C5 is electrically connected to the grounding terminal.

The receiver integrated circuit U3 has the following pins. VSS is electrically connected to the grounding terminal. GAIN_LNA is electrically connected to the grounding terminal. OUT_LNA is electrically connected to the first end of the capacitor C18, the first end of the inductor L4, and the second end of the capacitor C21. The second end of the capacitor C18 and the second end of the inductor L4 are electrically connected to the power source +V and the first end of the capacitor C25, and the second end of the capacitor C25 is electrically connected to the grounding terminal. IN_MIX1 is electrically connected to the first end of the capacitor C21. IF1 P is electrically connected to the first end of the resistor R9, and the second end of the resistor R9 is electrically connected to the second end of the resistor R8, the first end of the capacitor C19, and the power source +V. IF1 N is electrically connected to the first end of the resistor R8. The first VDD is electrically connected to the power source +V. OUT_MIX2 is electrically connected to the first end of the oscillator F1, and the second end of the oscillator F1 is electrically connected to the grounding terminal. IN_IFA is electrically connected to the third end of the oscillator F1 and the first end of the resistor R6, the second end of the resistor R6 is electrically connected to FBC2, the second end of the capacitor C12, and the first end of the capacitor C16, and the second end of the capacitor C16 is electrically connected to the grounding terminal. FBC1 is electrically connected to the first end of the capacitor C15 and the first end of the capacitor C12, and the second end of the capacitor C15 is electrically connected to the grounding terminal. The second VDD is electrically connected to the power source +V and the first end of the capacitor C11, and the second end of the capacitor C11 is electrically connected to the grounding terminal. OUT_IFA is idle. IN_DEM is idle. The third VDD is electrically connected to the power source +V and the first end of the capacitor C9, and the second end of the capacitor C9 is electrically connected to the grounding terminal. OUT_OA is electrically connected to the first end of the capacitor C6 and the first end of the resistor R3, the second end of the capacitor C6 is electrically connected to the grounding terminal, and the second end of the resistor R3 is electrically connected to the pin RB0/AN12 of the second microprocessor module 21. OAN is electrically connected to the first end of the capacitor C3 and the first end of the resistor R2, and the second end of the capacitor C3 is electrically connected to the grounding terminal. OAP is electrically connected to RSSI. RSSI is electrically connected to the first end of the capacitor C2 and the second end of the resistor R2, and the second end of the capacitor C2 is electrically connected to the grounding terminal. OUTP is idle. OUTN is idle. R0 is electrically connected to the first end of the capacitor C13, the second end of the capacitor C13 is electrically connected to the first end of the oscillator X2, and the second end of the oscillator X2 is electrically connected to the grounding terminal. The fourth VDD is electrically connected to the power source +V and the first end of the capacitor C1, and the second end of the capacitor C1 is electrically connected to the grounding terminal. ENRX is electrically connected to the fourth VDD. LF is electrically connected to the first end of the capacitor C14, the second end of the capacitor C14 is electrically connected to the first end of the resistor R7, and the second end of the resistor R7 is electrically connected to the grounding terminal.

The second microprocessor module 21 has 28 pins. RE3/$\overline{\text{MCLR}}$ is electrically connected to the first end of the resistor R1 and the pin 1 of the connector J1, and the second end of the resistor R1 is electrically connected to the power source +V. RA0/AN0 is electrically connected to the first end of the capacitor C30 and the first end of the resistor R25, the second end of the capacitor C30 is electrically connected to the grounding terminal, the second end of the resistor R25 is electrically connected to an output end of the operational amplifier U6B and the first end of the resistor R30, the second end of the resistor R30 is electrically connected to a first input end (i.e., the inverting input end) of the operational amplifier U6B and the first end of the resistor R27, and the second end of the resistor R27 is electrically connected to the grounding terminal. RA1/AN1 is electrically connected to the first end of the capacitor C31 and the first end of the resistor R23, the second end of the capacitor C31 is electrically connected to the grounding terminal, the second end of the resistor R23 is electrically connected to the output end of the operational amplifier U6A and the first end of the resistor R28, the second end of the resistor R28 is electrically connected to the first input end (i.e., the inverting input end) of the operational amplifier U6B and the first end of the resistor R29, and the second end of the resistor R29 is electrically connected to the grounding terminal. RA2/AN2 is electrically connected to the power management module 80. RA3/AN3 is electrically connected to the node AN2. RA4/T0CKI is idle. RA5/AN4 is electrically connected to the node AN3. The first VSS is electrically connected to the first end of the capacitor C8 and the first end of the capacitor C10, the second end of the capacitor C10 is electrically connected to the grounding terminal, the second end of the capacitor C8 is electrically connected to the first end of the oscillator X1 and RA7/CLKIN. RA6/CLKOUT is electrically connected to the second end of the oscillator X1 and the second end of the capacitor C10. RC0/T1CKI is idle. RC1/CCP2 is electrically connected to the display driving module 50. RC2/CCP1 is electrically connected to the display driving module 50. RC3/SCK is electrically connected to a drive switch 70. RC4 is electrically connected to the drive switch 70. RC5 is electrically connected to the drive switch 70. RC6 is electrically connected to the first end of the resistor R5, the second end of the resistor R5 is electrically connected to the second end (i.e., the negative end) of a light emitting diode D2, and the first end (i.e., the positive end) of the light emitting diode D2 is electrically connected to the power source +V. RC7 is electrically connected to the first end of the resistor R4, the second end of the resistor R4 is electrically connected to the second end (i.e., the negative end) of the light emitting diode D1, and the first end (i.e., the positive end) of the light emitting diode D1 is electrically connected to the power source +V. The second VSS is electrically connected to the grounding terminal. VDD is electrically connected to the power source +V and the first end of the capacitor C7, the second end of the capacitor C7 is electrically connected to the grounding terminal. RB0/AN12 is electrically connected to the wireless receiving module 31. RB1/AN10 is idle. RB2/AN8 is idle. RB3/AN9 is idle. RB4/AN11 is idle. RB5/AN13 is idle. RB6/ICSPCLK is electrically connected to the pin 5 of the connector J1. RB7/ICSPDAT is electrically connected to the pin 4 of the connector J1. In addition, the pin 3 of the connector J1 is electrically connected to the grounding terminal, and the pin 2 of the connector J1 is electrically connected to the power source +V.

The display driving module 50 includes a resistor R10, a resistor R11, a resistor R13, a resistor R14, a resistor R15, a resistor R16, a resistor R17, a resistor R21, a resistor R22, a resistor R23, a resistor R24, a resistor R25, a resistor R27, a resistor R28, a resistor R29, a resistor R30, a capacitor C26, a capacitor C27, a capacitor C29, a capacitor C30, a capacitor C31, an inductor L5, an inductor L6, a diode D5, a diode D6, a diode D7, an operational amplifier U6A, an operational amplifier U6B, a power transistor Q1, a power transistor Q2, a field effect transistor Q3, a field effect transistor Q4, and a battery BT1. The gate of the power transistor Q1 is electrically connected to a collector of the field effect transistor Q3 and the first end of the resistor R10. The source of the power transistor Q1 is electrically connected to the second end of the resistor R10 and the pin 1 of the connector J2, and the pin 2 of the connector J2 is electrically connected to the grounding terminal. The drain of the power transistor Q1 is electrically connected to the second end (i.e., the negative end) of the diode D7 and the first end of the inductor L5, and the first end (i.e., the positive end) of the diode D7 is electrically connected to the grounding terminal. The emitter of the field effect transistor Q3 is electrically connected to the grounding terminal and the first end of the resistor R1 6, the second end of the resistor R16 is electrically connected to a base of the field effect transistor Q3 and the first end of the resistor R13, and the second end of the resistor R13 is electrically connected to the second microprocessor module 21.

The gate of the power transistor Q2 is electrically connected to the collector of the field effect transistor Q4 and the first end of the resistor R11. The source of the power transistor Q2 is electrically connected to the second end of the resistor R11 and the second end (i.e., the negative end) of the diode D5. The drain of the power transistor Q2 is electrically connected to the second end (i.e., the negative end) of the diode D8 and the first end of the inductor L6. The first end (i.e., the positive end) of the diode D8 is electrically connected to the grounding terminal. The second end of the inductor L6 is electrically connected to the first end (i.e., the positive end) of the diode D6 and the first end of the capacitor C27. The second end of the capacitor C27 is electrically connected to the grounding terminal. The second end (i.e., the negative end) of diode D6 is electrically connected to the first end (i.e., the positive end) of the light emitting diode D9, the first end (i.e., the positive end) of the light emitting diode D10, and the first end (i.e., the positive end) of the light emitting diode D11.

The emitter of the field effect transistor Q4 is electrically connected to the grounding terminal and the first end of the resistor R17, the second end of the resistor R17 is electrically connected to the base of the field effect transistor Q2 and the first end of the resistor R14, and the second end of the resistor R14 is electrically connected to the second microprocessor module 21.

The second input end (i.e., the non-inverting input end) of the operational amplifier U6A is electrically connected to the second end of the resistor R21. The second input end (i.e., the non-inverting input end) of the operational amplifier U6B is electrically connected to the first end of the resistor R24. The second end of the resistor R24 is electrically connected to the negative electrode of the battery BT1 and the first end of the resistor R22, and the second end of the resistor R22 is electrically connected to the grounding terminal. The positive electrode of the battery BT1 is electrically connected to the second end (i.e., the negative end) of the diode D5 and the first end of the resistor R15. The second end of the resistor R15 is electrically connected to the first end of the capacitor C29, and the second end of the capacitor C29 is electrically connected to the grounding terminal. The first end (i.e., the positive end) of the diode D5 is electrically connected to the first end of the capacitor C26 and the second end of the inductor L5, and the second end of the capacitor C26 is electrically connected to the grounding terminal.

The drive switch 70 includes a resistor 18, a resistor 19, a resistor 20, a field effect transistor Q5, a field effect transistor Q6, and a field effect transistor Q7. The gate of the field effect transistor Q5 is electrically connected to the first end of the resistor 18, and the second end of the resistor 18 is electrically connected to the second microprocessor module 21. The source of the field effect transistor Q5 is electrically connected to the first end of the resistor 21 and the first end of the resistor 26, and the second end of the resistor 26 is electrically connected to the grounding terminal. The drain of the field effect transistor Q5 is electrically connected to the second end (i.e., the negative end) of the light emitting diode D9, and the first end (i.e., the positive end) of the light emitting diode D9 is electrically connected to the display driving module 50. The gate of the field effect transistor Q6 is electrically connected to the first end of the resistor 19, and the second end of the resistor 19 is electrically connected to the second microprocessor module 21. The source of the field effect transistor Q6 is electrically connected to the first end of the resistor 21 and the first end of resistor 26. The drain of the field effect transistor Q6 is electrically connected to the second end (i.e., the negative end) of the light emitting diode D10. The first end (i.e., the positive end) of the light emitting diode D10 is electrically connected to the display driving module 50. The gate of the field effect transistor Q7 is electrically connected to the first end of the resistor 20, and the second end of the resistor 20 is electrically connected to the second microprocessor module 21. The source of the field effect transistor Q7 is electrically connected to the first end of the resistor 21 and the first end of the resistor 26. The drain of the field effect transistor Q6 is electrically connected to the second end (i.e., the negative end) of the light emitting diode D11, and the first end (i.e., the positive end) of the light emitting diode D11 is electrically connected to the display driving module 50.

The power management module 80 includes a capacitor C20, a capacitor C22, a capacitor C23, a capacitor C24, a Zener diode D3, a diode D4, an inductor L3, a power management integrated circuit U4, and a voltage regulator integrated circuit U5. The pin IN of the power management integrated circuit U4 is electrically connected to the power source +V and the first end of the capacitor C24, and the second end of the capacitor C24 is electrically connected to the grounding terminal. The pin GND of the power management integrated circuit U4 is electrically connected to the grounding terminal. The pin OUT of the power management integrated circuit U4 is electrically connected to the second microprocessor module 21 and the first end of the capacitor C20, and the second end of the capacitor C20 is electrically connected to the grounding terminal. The pin IN of the voltage regulator integrated circuit U5 is electrically connected to the first end of the inductor L3 and the first end (i.e., the positive end) of the Zener diode D3, and the second end (i.e., the negative end) of the Zener diode D3 is electrically connected to the power source +V. The pin GND of the voltage regulator integrated circuit U5 is electrically connected to the grounding terminal. The pin OUT of the voltage regulator integrated circuit U5 is electrically connected to the first end of the capacitor C22, the first end of the capacitor C23, and the power source +V. The second end of the capacitor C22 is electrically connected to the grounding terminal. The second end of the capacitor C23 is electrically connected to the grounding terminal. The second end of the inductor L3 is electrically connected to the second end (i.e., the negative end) of the diode D4 and display driving module 50, and the first end (i.e., the positive end) of the diode D4 is electrically connected to the grounding terminal.

The circuit operation is described as follows.

First, the wireless receiving module 31 receives the wireless signal, which is filtered by the filter integrated circuit U1, and transmits the filtered signal to the receiver integrated circuit U3 for demodulation. The receiver integrated circuit U3 after finishing demodulation transmits the data RF_DATA to the second microprocessor module 21 for calculation. If the calculation result contains: (1) the frequency of the ignition signal descends, (2) the driver steps on the brake pedal, (3) the driver controls the vehicle to turn left, (4) the driver controls the vehicle to turn right or (4) the vehicle runs at idle speed for a predetermined time interval, control signals (CCP1, CCP2, LED1, LED2, and LED3) are sent out to drive the display module 60 to flash.

In view of the above, the vehicle deceleration warning apparatus of the present invention determines whether a driver intends to slow down through detecting the changes of the ignition signal. If the driver slows down, the vehicle deceleration warning apparatus controls a brake light to light on immediately, so as to reduce the time for the driver of the following vehicle to recognize the braking action, thereby improving the safety in driving vehicles. The control signal of the brake light is transmitted wireless transmission. As such, the driver may fix the brake light at an eye-catching position at will, such as on a safety cap, clothes, a bicycle mat, or a surface of rear lid, thereby enhancing the convenience of the brake light installation. Additionally, after the vehicle runs at idle speed for a time interval, a flickering light or sound is sent to alert the driver, so as to remind the driver to turn off the vehicle for saving fuel consumption and meeting environmental protection requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle deceleration warning apparatus, comprising:
    an ignition monitoring module, being electrically connected to an ignition signal generation module of the vehicle, receiving a first voltage signal generated by the ignition signal generation module, converting the received first voltage signal into a second voltage signal, and then outputting the second voltage signal;
    a first microprocessor module, electrically connected to the ignition monitoring module, performing a calculation based on a frequency of the second voltage signal output by the ignition monitoring module, deriving an encoded first display control signal when the frequency of the second voltage signal descends, and generating an encoded third display control signal after the frequency of the second voltage signal remains in an idle running state of the vehicle for a time interval; the first microprocessor module also generating an encoded second display control signal to indicate turning;
    a wireless transmitting module, being electrically connected to the first microprocessor module, receiving the first, second, and third display control signals, and transmitting the first, second, and third display control signals to a remote end by wireless transmission;
    a wireless receiving module, being disposed at the remote end, receiving the first, second, and third display control signals transmitted by the wireless transmitting module and decoding the first, second, and third display control signals;
    a second microprocessor module, being electrically connected to the wireless receiving module, and receiving the decoded first, second, and third display control signals;
    a display driving module, being electrically connected to the second microprocessor module, generating a first display driving signal according to the first display control signal received by the second microprocessor module, generating a second display driving signal according to the second display control signal, and generating a third display driving signal according to the third display control signal; and
    a display module, being electrically connected to the display driving module, generating a corresponding warning light according to the first display driving signal, the second display driving signal, or the third display driving signal output by the display driving module.

2. The vehicle deceleration warning apparatus as claimed in claim 1, further comprising:
    a turn indicating signal generator, being electrically connected to the first microprocessor module, generating a turn indicating signal and outputting the turn indicating signal to the first microprocessor module, for the first microprocessor module to generate the second display control signal; and
    a brake indicating signal module, being electrically connected to the first microprocessor module, generating a brake indicating signal and outputting the brake indicating signal to the first microprocessor module, for the first microprocessor module to generate the first display control signal.

3. A vehicle deceleration warning apparatus, comprising:
    an ignition monitoring module, being electrically connected to an ignition signal generation module of the vehicle, for receiving a first voltage signal generated by the ignition signal generation module, converting the first voltage signal into a second voltage signal and then outputting the second voltage signal;
    a microprocessor module, being electrically connected to the ignition monitoring module, for performing a calculation based on a frequency of the second voltage signal output by the ignition monitoring module, deriving a first display control signal when the frequency of the second voltage signal descends, and generating an encoded third display control signal after the frequency of the second voltage signal remains in an idle running state of the vehicle for a time interval; the microprocessor module also generating a second display control signal to indicate turning;

a display driving module, being electrically connected to the microprocessor module, for generating a first display driving signal according to the first display control signal output by the microprocessor module, generating a second display driving signal according to the second display control signal output by the microprocessor module, and generating a third display driving signal according to the encoded third display control signal output by the microprocessor module; and a display module, being electrically connected to the display driving module, for generating a corresponding warning light according to the first display driving signal, the second display driving signal, or the third display driving signal output by the display driving module.

4. The vehicle deceleration warning apparatus as claimed in claim 3, further comprising:

a turn indicating signal generator, electrically connected to the microprocessor module, for generating a turn indicating signal and outputting the turn indicating signal to the microprocessor module, for the microprocessor module to generate the second display control signal; and a brake indicating signal module, electrically connected to the microprocessor module, generating a brake indicating signal and outputting the brake indicating signal to the microprocessor module, for the microprocessor module to generate the first display control signal.

* * * * *